United States Patent
Sinha

(10) Patent No.: US 9,219,625 B2
(45) Date of Patent: Dec. 22, 2015

(54) DECISION FEEDBACK EQUALIZATION SLICER WITH ENHANCED LATCH SENSITIVITY

(71) Applicant: LSI Corporation, San Jose, CA (US)

(72) Inventor: Ashutosh Sinha, Santa Clara, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/259,264

(22) Filed: Apr. 23, 2014

(65) Prior Publication Data

US 2015/0312060 A1   Oct. 29, 2015

(51) Int. Cl.
  *H04L 25/03*   (2006.01)
  *H04L 5/14*    (2006.01)

(52) U.S. Cl.
  CPC ........ *H04L 25/03057* (2013.01); *H04L 5/1423* (2013.01)

(58) Field of Classification Search
  USPC ........................................ 375/233
  See application file for complete search history.

(56) References Cited

U.S. PATENT DOCUMENTS

| | | | |
|---|---|---|---|
| 7,949,075 B2 | 5/2011 | Brunsch et al. | |
| 8,483,639 B2 | 7/2013 | Lee et al. | |
| 8,576,099 B2 | 11/2013 | Roze et al. | |
| 8,599,909 B2 | 12/2013 | Doblar et al. | |
| 8,604,838 B2 | 12/2013 | Payne | |
| 8,611,379 B2 | 12/2013 | Raghavan et al. | |
| 2003/0099307 A1 | 5/2003 | Wu | |
| 2006/0227912 A1* | 10/2006 | Leibowitz et al. | 375/350 |
| 2012/0038390 A1 | 2/2012 | Raghavan | |
| 2014/0079169 A1 | 3/2014 | Raghavan et al. | |

OTHER PUBLICATIONS

Ibrahim, S. et al., "Low-Power CMOS Equalizer Design for 20-Gb/s Systems," IEEE Journal of Solid-State Circuits (2011) 46(6):1321-1336.
Katsuria, S. et al., "Techniques for High-Speed Implementation of Nonlinear Cancellation," IEEE Journal on Selected Areas in Communications (1991) 9(5):711-717.

(Continued)

*Primary Examiner* — Kabir A Timory
(74) *Attorney, Agent, or Firm* — Sheridan Ross P.C.

(57) ABSTRACT

A decision feedback equalization slicer for ultra-high-speed backplane Serializer/Deserializer (SerDes) with improved latch sensitivity. A first regeneration stage can be configured in association with a second regeneration stage to compensate for channel impairment such as Inter-symbol interference due to channel loss, reflections due to impedance mismatch, and cross-talk interference from neighboring electrical channels. The first regeneration stage includes two first stage slicers corresponding to a set of speculative decision (+h1 and −h1). A multiplexer can be placed at an input port of the second regeneration stage to select the set of speculative decision based on previous decision in order to save hardware and power. The DFE slicer samples the Input signal, regenerates the sampled data, stores the data on storage element like RS-latch or flip-flop, and presets the regeneration nodes to high or low values in preparation for sampling the next input data.

20 Claims, 8 Drawing Sheets

(56) References Cited

OTHER PUBLICATIONS

Montanaro, J. et al., "A 160-MHz, 32-b, 0.5-W CMOS RISC Microprocessor," IEEE Journal of Solid-State Circuits (1996) 31(11):1703-1714.

Zhong, F. et al., "A 1.0625~14.025 Gb/s Multi-Media Transceiver with Full-Rate Source-Series-Terminated Transmit Driver and Floating-Tap Decision-Feedback Equalizer in 40 nm CMOS," IEEE Journal of Solid-State Circuits (2011) 46(12):3126-3139.

* cited by examiner

DECISION FEEDBACK EQUALIZATION SLICER WITH ENHANCED LATCH SENSITIVITY

FIELD OF THE INVENTION

Embodiments are generally related to equalization techniques for high-speed data communications. Embodiments are also related to DFE (Decision Feedback Equalizer) devices, components, and techniques.

BACKGROUND

Maximum data rate transfer over a backplane is limited by a number of factors including, for example, frequency dependent insertion loss, crosstalk noise, and reflection caused by impedance mismatch in media. These impairments can reduce the signal strength at the receiver. The eye-diagram or eye-opening can be used as a metric regarding signal swing or strength at the receiver. For an electrical link to function in the presence of such impairments first the signal strength has to be improved by equalization and second, the receiver latch sensitivity must be improved so that even a small signal at the receiver can be detected correctly.

To enable electrical signaling at speed of tens of gigabits per second, equalization both at the transmitter and receiver is required. Transmitter FIR filters (known as "Pr-emphasis" and "De-emphasis") are commonly employed transmitter equalization components that attenuate low-frequency signals relative to the Nyquist frequency. A FIR liter can render the overall system response flatter and removes ISI (inter-symbol interference). Such devices, however, can lead to lower signal swing and render them more sensitive to noise.

A continuous-time linear equalizer (CTLE) can be employed at the receiver to boost the high frequency component around the Nyquist frequency of the signals to remove ISI. Such a continuous-time linear equalizer also amplifies crosstalk and does not improve the SNR (Signal-to-noise ratio) of the signal. Both transmitter FIR equalization and receiver CTLE components are incapable of equalizing reflections caused by impedance mismatch and additionally can amplify the crosstalk noise.

Decision Feedback Equalization (DFE) at the receiver is effective in cancelling both ISI and reflections and boosting high frequency signals without noise and crosstalk amplification. Conventional DFE designs do not ensure, however, that the DFE feedback loop timing is met at very high data rate. In other words, the DFE correction signal has settled at the slicer input before the next decision is made when the data rate is very high. The DFE feedback loop delay can include: (1) decision making time of the slicer; (2) settling time of the DFE summer amplifier; and (3) setup time of the slicer.

The decision-making time of the slicer is the main component of the DFE feedback loop delay. The decision making process of the slicer can be divided into four stages. A small input signal, for example, less than 15 mV, can be sampled and amplified (or regenerated) to a CMOS level (e.g., ~1V), the decision is stored in a RS-latch and the slicer nodes are preset (or reset) to allow for the next decision. As the signal at slicer input becomes smaller, the time taken by the slicer to regenerate the signal increases and becomes the most dominant delay factor in the feedback loop timing. For applications where electrical trace lengths run longer, the electrical signal suffers a large loss and the signal (eye opening) at the receiver input is very small. It is very important that latch sensitivity be improved to detect even the smallest signal if the electrical link has to function reliably.

Such prior art approaches do not complete all four task of the slicer within 1 UI (Unit Interval Time) which is, for example, 35.7 ps for a 28 gbps data rate. Furthermore, as the number of DFE taps increases, the parasitic load on the summing node increases, thereby decreasing the buffer bandwidth and adversely impacting the signal settling time.

Based on the foregoing, it is believed that a need exists for an Improved decision feedback equalization slicer for ultra high-speed backplane Serializer/Deserializer (SerDes) with improved latch sensitivity, as will be described in greater detail herein.

SUMMARY

The following summary is provided to facilitate an understanding of some of the Innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved equalization techniques for high-speed data communications.

It is another aspect of the disclosed embodiments to provide for an improved decision feedback equalizer (DFE).

It is yet another aspect of the disclosed embodiments to provide for an improved decision feedback equalization slicer for use with an ultra high-speed backplane Serializer/Deserializer (SerDes) with improved latch sensitivity.

The aforementioned aspects and other objectives and advantages can now be achieved as described herein. A decision feedback equalization slicer for ultra-high-speed backplane Serializer/Deserializer (SerDes) with improved latch sensitivity is disclosed herein. A first regeneration stage can be configured in association with a second regeneration stage to compensate for inter-symbol interference. The first regeneration stage can include, for example, two first stage slicers corresponding to a set of speculative decisions (e.g., +h1 and −h1 in the case of a 1-tap loop-unrolled DFE architecture). A multiplexer can be located at an input port of the second regeneration stage to select between a set of speculative decisions based on the previous decision so that only one second regeneration stage is required in order to conserve hardware and power.

A precise clock generation circuit can be coupled to the first regeneration stage and the second regeneration stage to maximize re-generation time and improve sensitivity. An offset cancellation can be accomplished by re-using one of the differential-pairs of the first stage slicer. For example, the offset correction value can be merged with the speculative h1 correction value so that both tasks can be accomplished by employing only one differential-pair. In this way, a large offset can be cancelled without adding extra load on the regeneration node of the slicer and limiting slicer sensitivity and speed. The DFE slicer can sample the input signal, regenerate the sampled data, store the data on a storage element such as a RS-latch or flip-flop, and then preset the regeneration nodes to a high or a low value in preparation for sampling the next input data.

The first regeneration stage of the slicer can include, for example, three input differential pairs that correspond to a data input, a DFE sum (for h2 and higher tap) input, and first (or h1) tap correction input. The first (or h1) tap correction signal and an offset correction signal can be combined together to reduce the number of input pairs and hence the load on the first stage thereby achieving satisfactory latch sensitivity and also a very high frequency operation. The input differential pair can be implemented along with the sampling dock in parallel to a regeneration cross-coupled inverter pair in order to permit room for more voltage across the cross-coupled inverter regeneration pair. This implementation can reduce the number of stacked MOS device in the circuit to only three. This helps to reduce the power supply required for the circuit to function at a high speed and therefore save power.

The second stage slicer generally utilizes only one clock for both sampling and regeneration and does not require a separate sampling clock as the output of the first stage is valid for 1 UI. Generating a sampling clock at a very high speed consumes a great deal of power and additional hardware required can also increase the chip area and hence cost. The implementation described herein can therefore conserve power and reduce hardware costs. The second stage output drives a storage element (e.g., RS-latch or Flip-Flop).

The clocking circuit can utilize only one phase of the clock to generate clocks for the two stages of the slicer, thereby ensuring a smoother transfer of partially regenerated data between the first and second stages even in presence of jitter and duty cycle distortions. The sample and regeneration phase of the slicer operation can be maximized and may borrow time from a preset phase of the clock by skewing the rise/fall time of the logic gates in the clocking circuit to significantly improve the latch sensitivity.

The sampling pulse width of the first stage of the slicer can be controlled by controlling the delay through a logic gate chain such as inverter. The overlap between the first stage partially regenerated data and second stage sampling and regenerate clock can be controlled by controlling another delay associated with the logic gate such as inverter. The clocking circuit can be configured to include features to turn off the dock to the slicer through a control signal (e.g., power-down) to assist during the latch offset calibration phase.

The circuit can function at a lower power supply, which renders it suitable for deep sub-micron technologies where the power supply can be scaled down in each generation.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 5A and 58 illustrate a detailed circuit diagram depicting a possible implementation of a clock generation circuit, in accordance an alternative embodiment.

DETAILED DESCRIPTION

The particular values and configurations discussed in these non-limiting examples can be varied and are cited merely to illustrate one or more embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the Invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the Invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
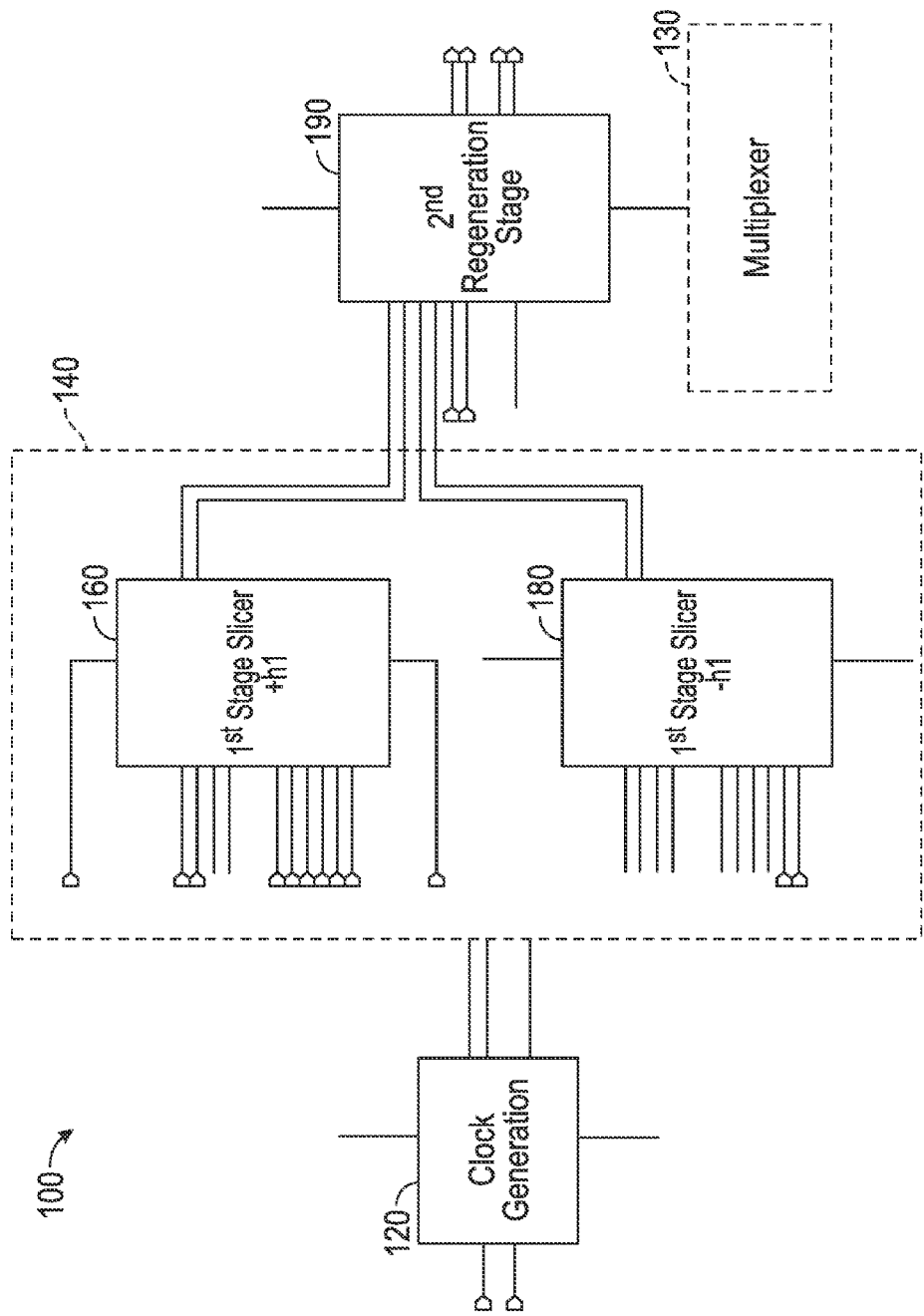
FIG. 1 illustrates a schematic view of a DFE slicer circuit that includes a first and second regeneration stage and a dock generation circuit, in accordance with the disclosed embodiments.

FIG. 1 illustrates a schematic view of a DFE slicer circuit 100, in accordance with a preferred embodiment. Note that in FIGS. 1-8, identical or similar blocks are generally indicated by identical reference numerals. The DFE slicer circuit 100 generally includes a first regeneration stage 140, a second regeneration stage 190, and a clock generation circuit 120. In general, the decision feedback equalizer (DFE) 100 can be configured as a nonlinear equalizer that employs a previous detector decision to eliminate the inter-symbol interference with respect to pulses that are currently being detected. In other words, the distortion on a current pulse that was caused by previous pulses is subtracted. The DFE slicer circuit 100 can be employed for ultra high-speed backplane SerDes with latch sensitivity of less than 15 mV. The DFE slicer circuit 100 can be utilized, for example, in 28 gbps backplane SerDes to implement DFE functionality in receiver. It can be appreciated that such values are indicated herein for exemplary purposes only and are not limiting features of the disclosed embodiments.

In general, a Serializer/Deserializer (SerDes pronounced sir-deez) is a pair of functional blocks commonly used in high speed communications to compensate for limited input/output. These blocks convert data between serial data and parallel interfaces in each direction. The term "SerDes" generically refers to interfaces used in various technologies and applications. The primary use of a SerDes is to provide data transmission over a single/differential line in order to minimize the number of I/O pins and interconnects.

The first regeneration stage 140 further includes two first stage slicers 160 and 180 corresponding to a set of speculative decisions (e.g., "+h1" and "−h1"). A multiplexer 130 can be placed at an input port of the second regeneration stage 190 to select +h1 and −h1 so that only one second regeneration stage is needed in order to save hardware and power. The precise clock generation circuit 120 maximizes the re-generation time and Improves sensitivity. The DFE slicer circuit 100 samples an input signal, regenerates the sampled data, stores the signal on storage element such as RS-latch or flip-flop, and preset the regeneration nodes to high or low value in preparation for sampling next input data.

Figure 2:
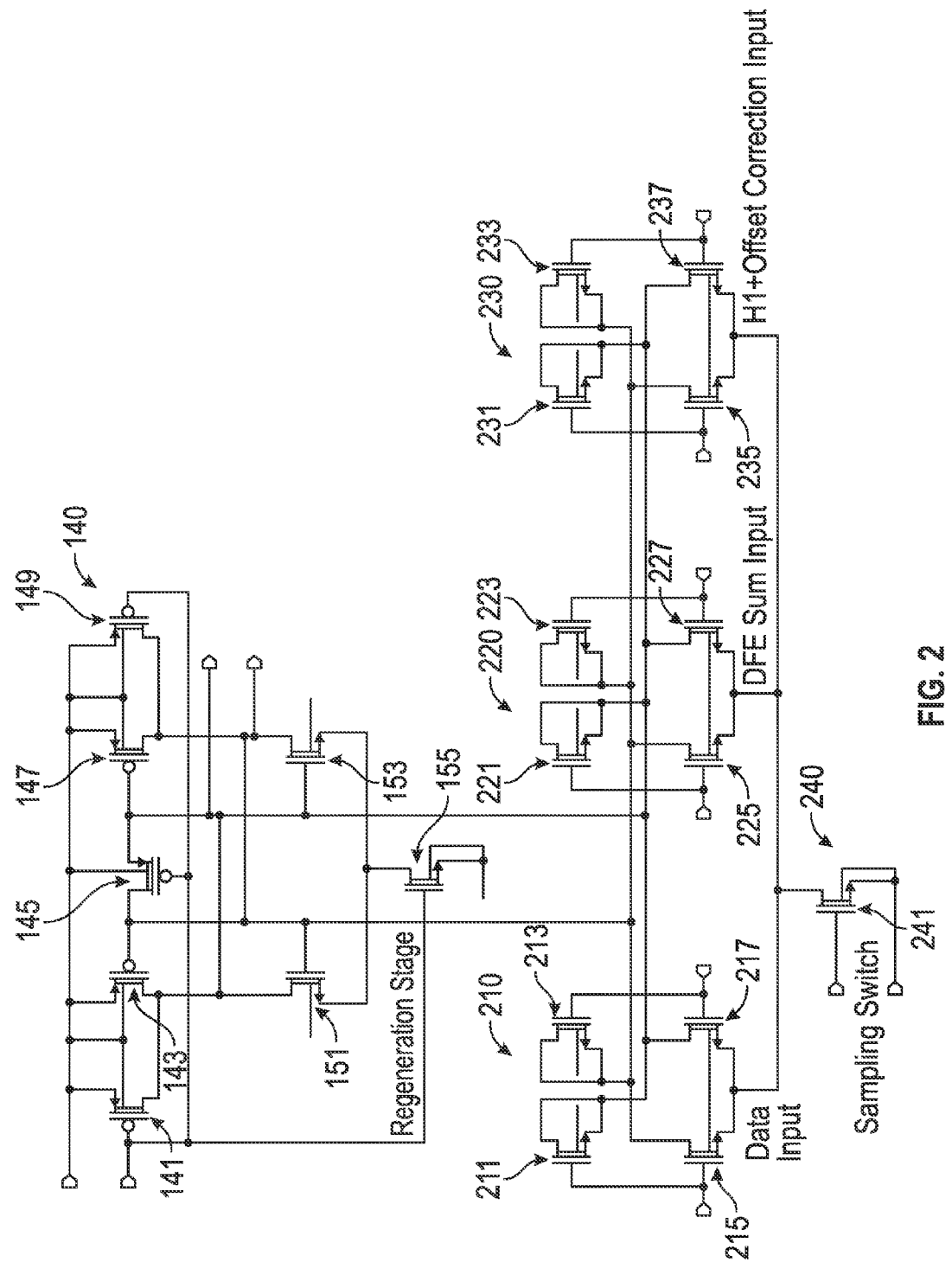
FIG. 2 illustrates a circuit diagram of a first regeneration stage of the DFE slicer, in accordance with the disclosed embodiments.

FIG. 2 illustrates a circuit diagram of the first regeneration stage 140 of the DFE slicer circuit 100, in accordance with an embodiment. The first regeneration stage 140 generally includes or is electrically connected to three input differential pairs corresponding to a data input component 210, a DFE sum (for h2 and higher tap) input component 220, first (or h1) tap correction+offset correction input component 230, and a sampling switch 240. In general, the first regeneration stage can be composed of a variety of electrical components, such as, for example, a transistor 141 connected to a transistor 143, which in turn is electrically connected to a transistor 145. A transistor 147 is electrically connected to a transistor 149. Transistors 151 and 153 are also included with the first regeneration stage 140 and are connected to a transistor 155.

The data input component 210 generally includes transistors 211, 213 and transistors 215, 217. The DFE sum input component 220 generally includes transistors 221, 223 and transistors 225, 227. The h1-tap correction+offset correction input component 230 includes transistors 231, 233 and 235, 237. Components 210, 220, and 230 are electrically connected to the sampling switch 240 which includes one or more transistors such as, for example, transistor 241.

The H1 correction signal and the offset correction input component 230 can be combined together to reduce the number of input pair and hence the load on the first stage 140 that results slicer achieving very good sensitivity and also high frequency operation. The input differential pair 210, 220, and 230 can be implemented along with the sampling dock 120 in parallel to a regeneration cross-coupled inverter pair.

Figure 3:
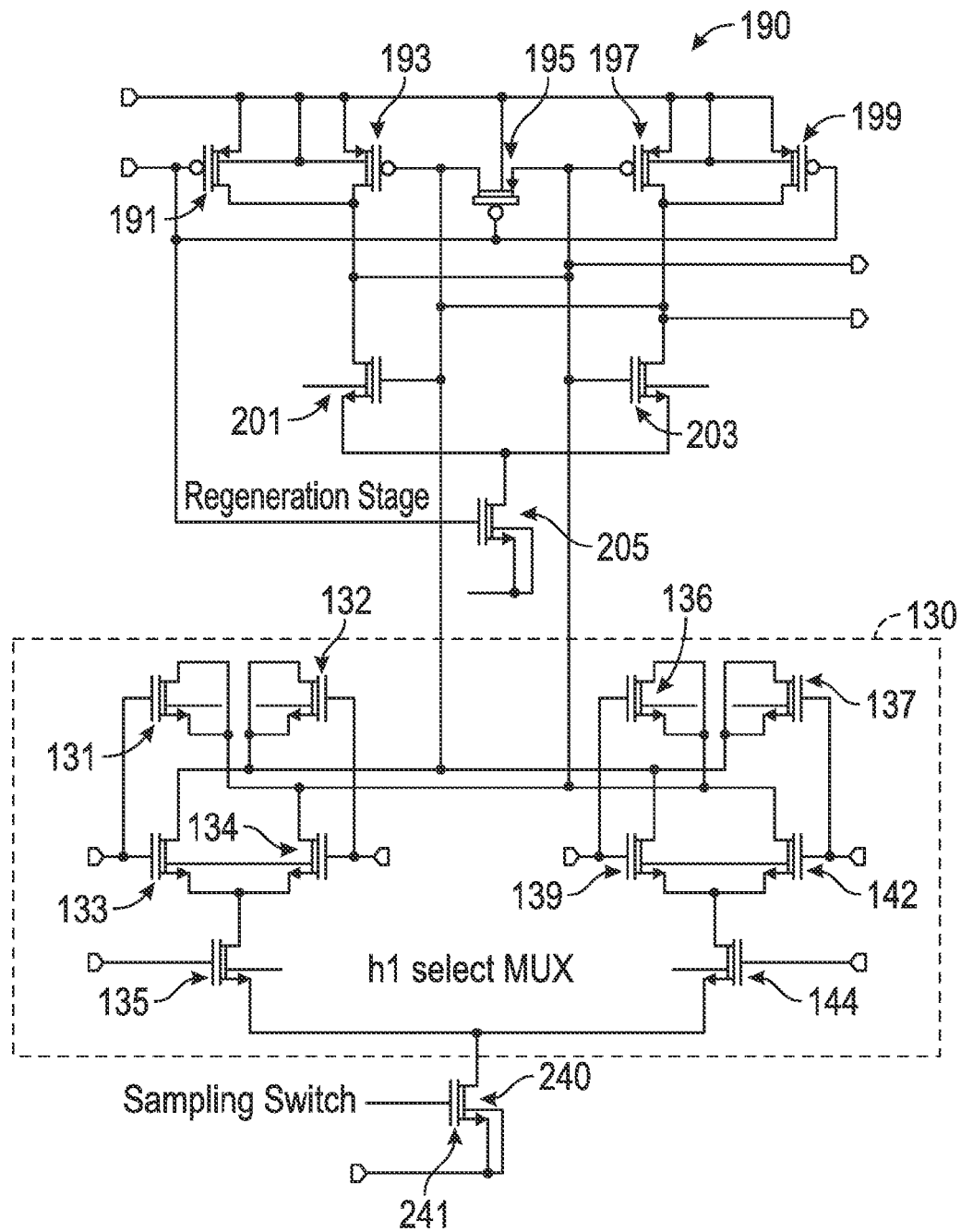
FIG. 3 illustrates a circuit diagram of a second regeneration stage of the DFE slicer, in accordance with the disclosed embodiments.

FIG. 3 illustrates a circuit diagram of the second regeneration stage 190 of the DFE slicer circuit 100, in accordance with an embodiment. The second regeneration stage 190 uses the same basic circuit as the first stage slicer 140 except the +/−h1 selection multiplexer 130. The second regeneration stage 190 generally includes a number of electrical components, such as, for example, transistor 191 coupled electrically to transistor 193, a transistor 195 connected electrically to transistor 193 and transistor 197. The transistor 197 can be electrically connected to a transistor 199. The second regeneration stage 190 can also include, for example, transistors 201, 203, and 205.

The multiplexer 130 can also include a number of electrical components, such as, for example, transistors 131, 132 and transistors 133, 134. Transistors 133, 134 are connected electrically to a transistor 135. Additionally, transistors 136, 137 can be connected electrically to transistors 139, 142, which in turn can connect electrically to transistor 144. Transistors 135, 144 can in turn connect electrically to the sampling switch 240 (which includes, for example, transistor 241).

The multiplexer 130 selects between the two can be placed at an input port of the second stage slicer 190. Hence, only one second stage slicer 190 is required in order to save hardware and power. The second stage slicer 190 uses only one dock for both sampling and regeneration. The second stage slicer 190 does not need a separate sampling dock as output of the first stage slicer 140 is valid for 1 UI. This helps save power and hardware cost. The second stage slicer 190 output drives a storage element such as RS-latch or Flip-Flop.

Figure 4:
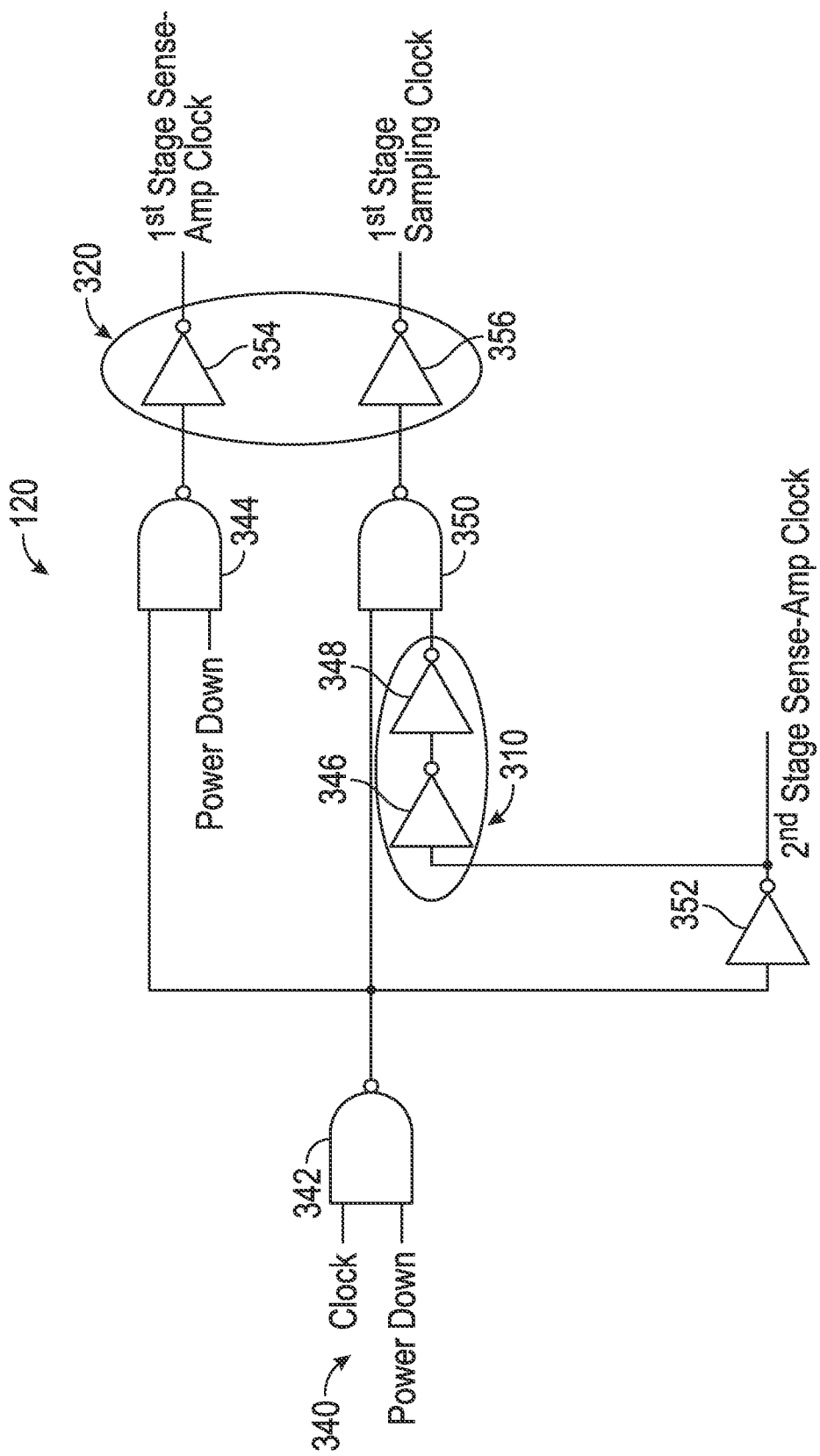
FIG. 4 illustrates a conceptual circuit diagram of a clock generation circuit, in accordance with the disclosed embodiments.

FIG. 4 illustrates a circuit diagram of the dock generation circuit 120 (i.e., docking circuit), in accordance with one embodiment. The clock generation circuit 120 generally includes a number of electronic/logic components, such as, for example, a NAND gate 342 whose output is connected to an input of a NAND gate 350, an input of a NAND gate 344, and an input of an Inverter 352. Additionally, an inverter chain 310 includes inverters 346, 348, the output of which is supplied as input to the NAND gate 350. Output from NAND gates 344 and 350 are respectively input to inverters 354, 356. The inverters 354, 356 form an inverter circuit with respective outputs ($1^{st}$ Stage Sense-Amp Clock and $1^{st}$ Stage Sampling Clock).

Figure 5A:
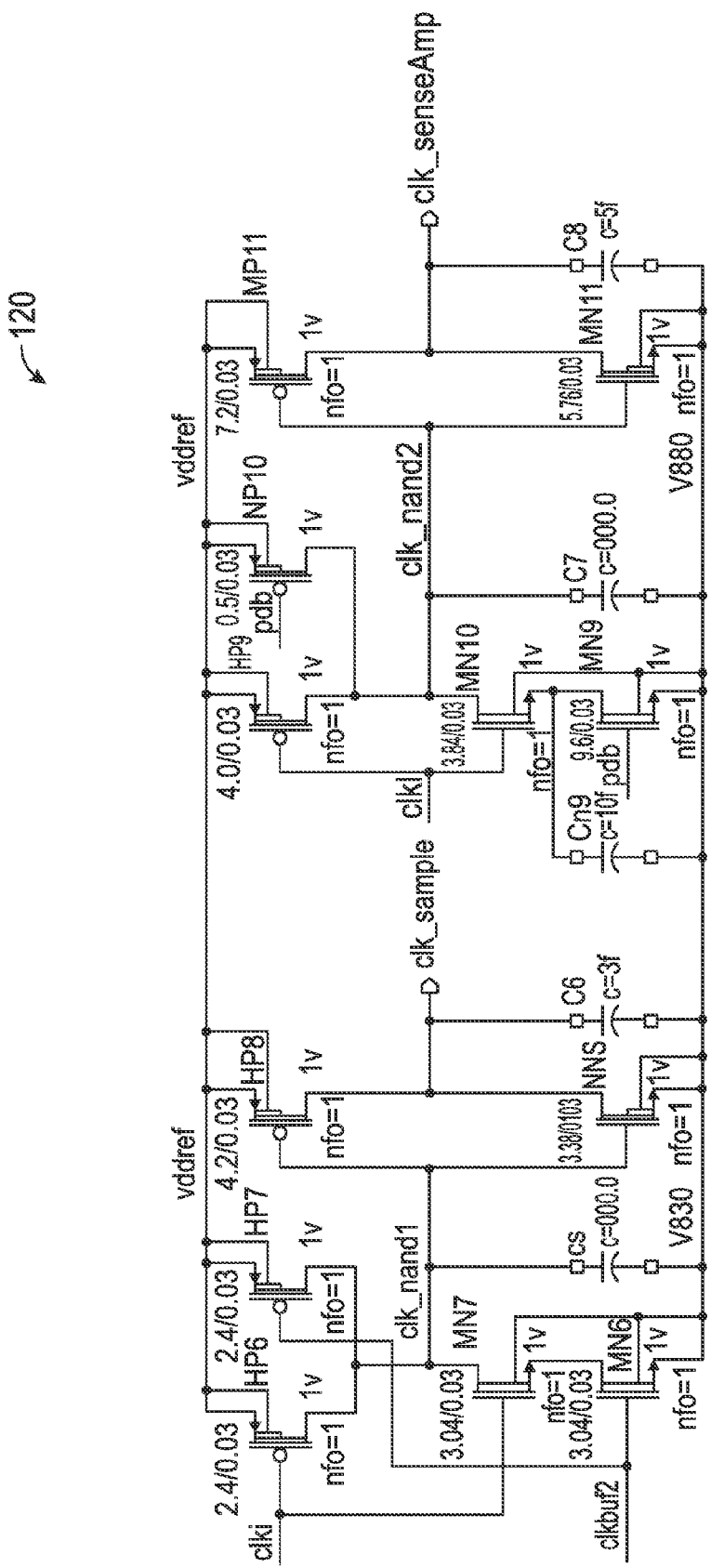
Figure 5B:
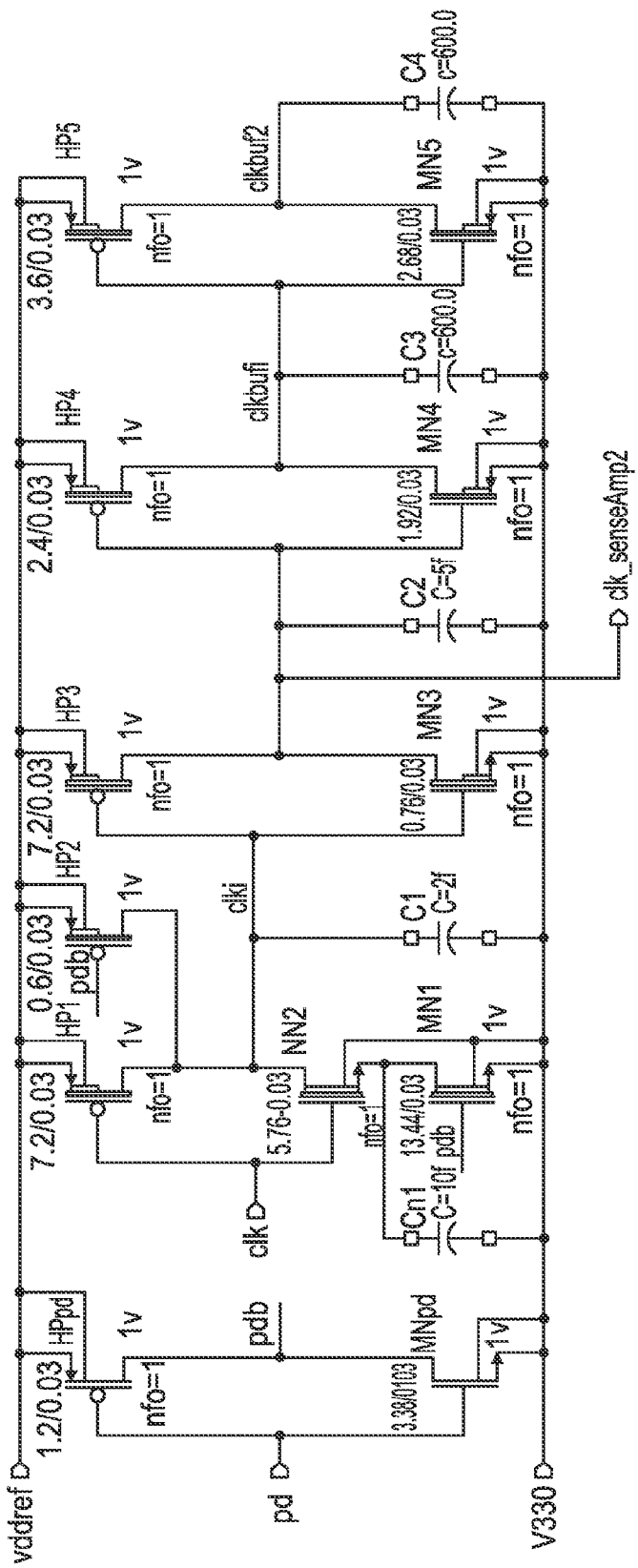

FIGS. 5A-5 illustrate detailed circuit diagrams depicting possible implementation of the clock generation circuit 120, in accordance an alternative embodiment. Note that although particular values are shown in FIGS. 5A-5B with respect to particular components (e.g., transistors, etc.), it can be appreciated that such values are indicated for illustrative purposes only and are not considered limiting features of the disclosed embodiments. That is, other values and other components may be implemented. The schematic diagrams shown in FIGS. 5A-5B are provided simply to illustrate a "real world" model and one possible embodiment.

In general, the docking circuit 120 uses only one phase of the clock to generate docks for the two stages of the slicer 140 and 190 ensuring smoother transfer of partially regenerated data between first and second stage 140 and 190 even in the presence of jitter and duty cycle distortion. The input signal can be sampled and the sampled data can be regenerated and the regeneration nodes can be presented to high or low value in preparation for sampling next input data. The sample and regeneration phase of the slicer operation is more productive phase of the slicer operation and maximizing it can significantly improve the latch sensitivity. The sample and regenerate phase of the clock borrows time from the preset phase of the clock to improve slicer sensitivity. This can be achieved by skewing the rise/fall time of the logic gates in the clocking circuit 120.

The sampling pulse width of the first stage of the slicer 140 can be controlled by controlling the delay through a chain of logic gates such as the inverter chain 310. The overlap between the first stage 140 partially regenerated data and second stage 190 sampling and regenerate clock can be controlled by controlling the delay of logic gates such as, for example, inverter component 320 (i.e., inverters 354, 356). The clocking circuit 120 has the feature to turn off the clock to the slicer through a control signal 340 (power-down). This helps during the latch offset calibration phase. Latch offset calibration for the data, crossing, error, and eye-finder latch in the DFE circuit 100 can be done one at a time and during that time it can be desirable to have the other slicers in power down mode so that there is no kick-beck noise from the other slicers that can affect the calibrated offset value of the latch.

Figure 6:
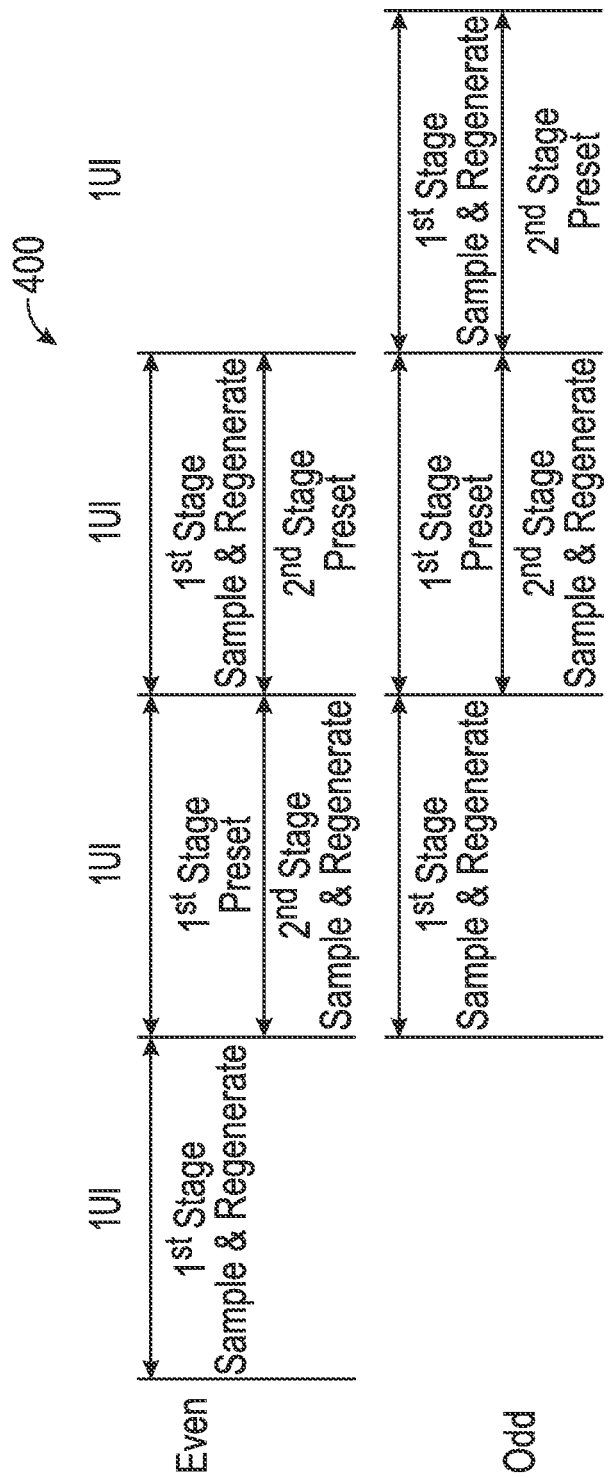
FIGS. 6-7 illustrate a timing diagram of the DFE circuit that split the slicer functionality into two pipelined stages spanning over 3 UI, in accordance with the disclosed embodiments.
Figure 7:
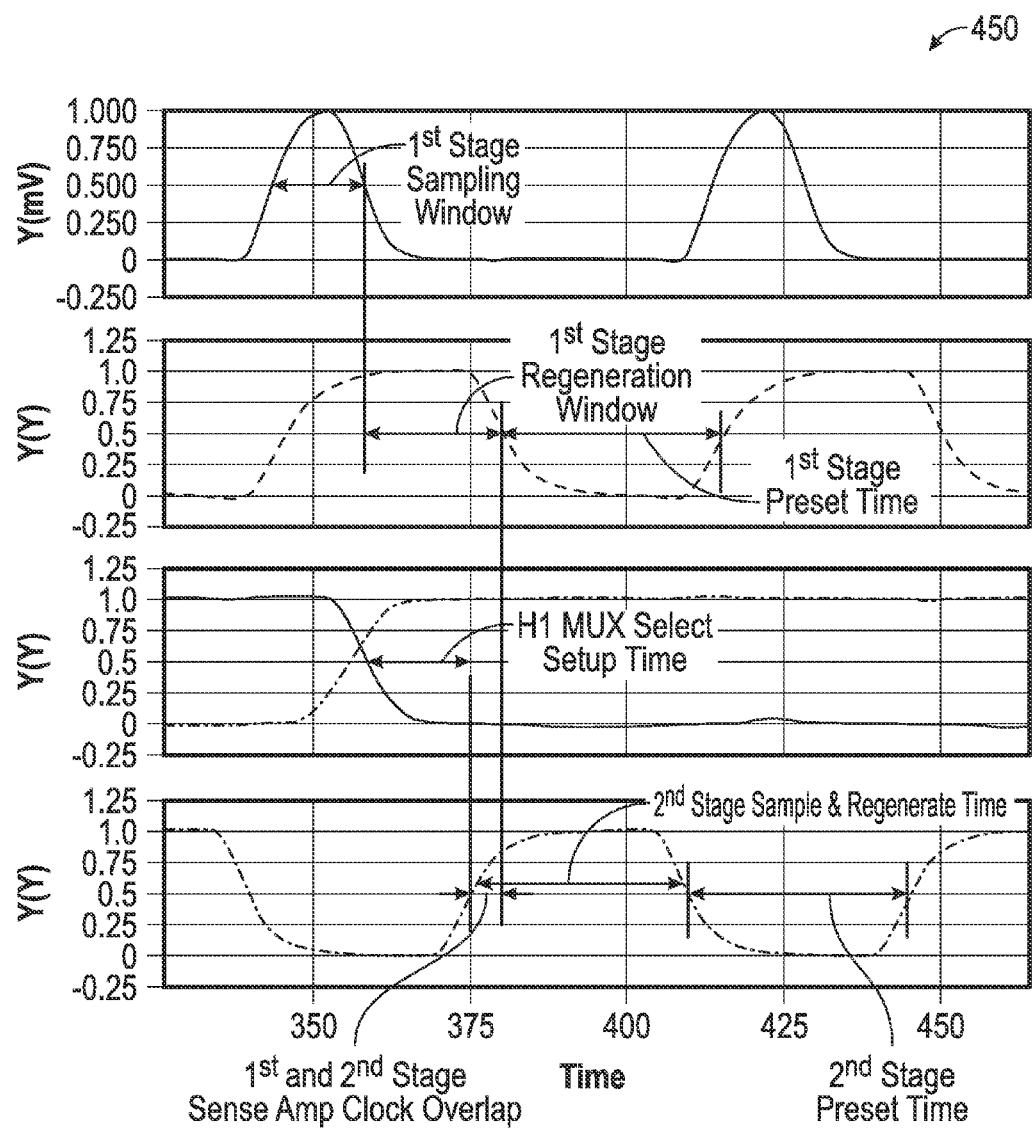

FIGS. 6-7 illustrate sample timing diagrams 400 and 450 of the DFE circuit 300 that split the slicer functionality into two pipelined stages spanning over 3 UI, in accordance with the disclosed embodiments. During the regeneration phase of the DFE circuit 300, the signal grows exponentially and its amplitude as a function of time (t) can be approximated as indicated by equation (1) below:

$$V(t) \alpha \Delta Vin^{*} \exp\{(Gm\_eff^{*}t)/Cload\} \quad (1)$$

In equation (1), $\Delta Vin$ represents the input signal's sampled value (e.g., <15 mV), and Gm_eff represents the effective trans-conductance of the cross-coupled inverter pair, which can be utilized to regenerate the signal. "Cload" in equation (1) represents the total capacitive load on the regeneration node. The slicer implementation takes advantage of half-rate and 1-tap loop-unrolled DFE circuit 300 to split the slicer functionality into two pipelined stages spanning over 3 UI as shown in FIG. 6 and FIG. 7. Hence, the slicer can utilize more than 1 UI of time for signal regeneration, which significantly improves the slicer sensitivity. In the two stage slicers 140 and 190, the capacitive load of the first stage 140 can be made very small, as it has to drive only the sampling input differential pair of the second stage slicer 190. This configuration further improves the slicer sensitivity.

FIG. 7 illustrates a diagram that depicts the detailed relationship between the sampling dock and regeneration clock of the first stage of slicer 140 and the second stage 190 sample and regenerate dock, in accordance with an embodiment. The multiplexer 130 can be placed at the input port of the second regeneration stage 190 to select +h1 and −h1 in order to save hardware and power. The precise dock generation circuit 120 can be utilized to maximize the re-generation time and improves sensitivity. The offset cancellation can be accomplished by re-using one of the differential-pairs of the first stage slicer. For example, the offset correction value can be merged with the speculative h1 correction value so that both tasks can be accomplished using only one differential-pair. In this manner, a large offset can be cancelled without adding extra loads to the regeneration node of the slicer while not limiting slicer sensitivity and speed. The input signal can be sampled via the DFE slicer architecture 100, the sampled data can be regenerated, and the regeneration nodes can be presented to a high or a low value in preparation for sampling next input data.

The two stage slicers 140 and 190 correctly resolve the smallest differential input signal in a given amount of time so that all DFE taps feedback loop timing is met. The two stage slicers 140 and 190 achieves sensitivity of <15 mV at 28 Gbps operation. The multiplexer 130 that selects between +h1 and −h1 can be placed at the input of second stage slicer 190 in order to eliminate the need for a two second stage slicer and saves power. The DFE architecture 100 requires low headroom requirement due to folded structure of the slicer with only three stacked MOS devices 210, 220, and 230 in the circuit 100. This makes the circuit 100 ideal for low voltage power supply in deep sub-micron technology and permits room for more voltage across the cross-coupled inverter regeneration pair, i.e. more gm can be achieved for smaller size of the transistor and hence faster operation can be achieved. This also results in bigger swing and hence more immunity to power supply noise. The circuit 100 does not use an Inductor to achieve speed and hence results in small area implementation.

The precise clock generation circuit 120 maximizes the re-generation time and improves sensitivity.

The DFE slicer circuit 100 can work at lower power supply to make it suitable for deep sub-micron technologies where power supply can be scaled down in each generation. Even for smaller power supply the DFE slicer circuit 100 can generate bigger regenerated signal. The sampling and regeneration dock signal can be made separate signal to permit tight control of the sampling width of the sampling signal. This is important for high loss wire-line application where received signal eye can be as small as 0.3 UI. Prior Art like Strong ARM latch employs same clock signal for both sampling the input and enabling the regeneration circuit. For wire-line application where received signal eye-opening can be small results in reduced slicer sensitivity because during the regeneration phase, input signal may start to move into opposite direction.

A decision feedback equalization slicer for ultra-high-speed backplane Serializer/Deserializer (SerDes) with improved latch sensitivity is thus disclosed. A first regeneration stage can be configured in association with a second regeneration stage to compensate for an inter-symbol interference. The first regeneration stage includes two first stage slicers corresponding to a set of speculative decision (e.g., +h1 and −h1).

A multiplexer can be placed at an input port of the second regeneration stage to select the set of speculative decision based on previous decision in order to save hardware and power.

A precise clock generation circuit can be coupled to the first regeneration stage and the second regeneration stage to maximize re-generation time and Improves sensitivity. An offset cancellation can be accomplished by re-using a first stage slicer input differential-pair in order to cancel large offset without adding extra load on the circuit and limiting the speed. The DFE slicer samples the input signal, regenerates the sampled data, stores the data on storage element like RS-latch or flip-flop, and presets the regeneration nodes to high or low values in preparation for sampling the next input data.

Based on the foregoing, it can be appreciated that a number of embodiments are disclosed. In one embodiment, a decision feedback equalization circuit can be implemented, which includes, for example: a first regeneration stage in association with a second regeneration stage to compensate for interference, wherein the first regeneration stage comprises at least two slicers corresponding to a set of speculative decisions; a multiplexer placed at an Input port of the second regeneration stage to select a set of speculative decisions based on a previous decision; and a precise clock generation circuit connected to the first regeneration stage and the second regeneration stage to maximize re-generation time and improve sensitivity.

In another embodiment, a differential-pair can be provided, which is re-usable for offset cancellation by merging an offset correction signal with a speculative h-tap correction signal to cancel a large offset without adding an additional load to the circuit and without adding limitations in latch sensitivity or speed to the circuit. In still another embodiment, the clock generation circuit can include a sampling phase to sample an input signal. In yet another embodiment, the clock generation circuit can include a regeneration phase to regenerate the sampled data.

In another embodiment, the clock generation circuit can include a preset phase to preset the regeneration node to a high or a low value in preparation for sampling a next input data, along with a sampling phase, and a regeneration phase borrow time from a preset phase to improve latch sensitivity associated with the circuit. In some embodiments, the first regeneration stage may include at least two input differential pairs with respect to a data input, a decision feedback equalization sum input, and/or an offset correction input. In yet other embodiments, the two (or more) input differential pairs can be associated with a sampling dock in parallel with a regeneration inverter pair to permit additional voltage across a cross-coupled inverter regeneration pair of the circuit.

In another embodiment, the second regeneration stage can employ a single dock for sampling and a regeneration phase as an output of the first regeneration stage is valid for a unit interval time. In yet another embodiment, the clock generation circuit can employ a single phase of a clock to generate a clock for the first regeneration stage and the second regeneration stage to ensure a smoother transfer of partially regenerated data with respect to the first regeneration stage and the second regeneration stage.

In yet another embodiment, a decision feedback equalization circuit can be implemented, which includes a first regeneration stage in association with a second regeneration stage to compensate for interference, wherein the first regeneration stage includes two or more slicers corresponding to a set of speculative decisions; a multiplexer placed at an input port of the second regeneration stage to select a set of speculative decisions based on a previous decision; a precise clock generation circuit connected to the first regeneration stage and the second regeneration stage to maximize re-generation time and improve sensitivity; and a differential-pair that is re-usable for offset cancellation by merging an offset correction signal with a speculative h-tap correction signal to cancel a large offset without adding an additional load to the circuit and without adding limitations in latch sensitivity or speed to the circuit.

In yet another embodiment, a method of decision feedback equalization can be provided. Such a method can include the steps or logical operations of, for example: compensating for interference via a first regeneration stage in association with a second regeneration stage, wherein the first regeneration stage includes two or more slicers corresponding to a set of speculative decisions; selecting a set of speculative decisions based on a previous decision via a multiplexer placed at an Input port of the second regeneration stage to select the set of speculative decisions based on the previous decision; and maximizing re-generation time and Improving sensitivity via a precise clock generation circuit connected to the first regeneration stage and the second regeneration stage to maximize the re-generation time and improve the sensitivity.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A decision feedback equalization circuit, comprising:
   a first regeneration stage in association with a second regeneration stage to compensate for interference, wherein said first regeneration stage comprises at least two slicers corresponding to a set of speculative decisions;
   a multiplexer placed at an input port of said second regeneration stage to select a set of speculative decisions based on a previous decision;
   a precise clock generation circuit connected to said first regeneration stage and said second regeneration stage to maximize re-generation time and improve sensitivity; and
   a differential-pair that is re-usable for offset cancellation by merging an offset correction signal with a speculative h-tap correction signal to cancel a large offset without adding an additional load to said circuit.

2. The circuit of claim 1 wherein said clock generation circuit comprises a sampling phase to sample an input signal.

3. The circuit of claim 1 wherein said clock generation circuit comprises a regeneration phase to regenerate said sampled data.

4. The circuit of claim 1 wherein:
   said clock generation circuit comprises a preset phase to preset said regeneration node to a high or a low value in preparation for sampling a next input data; and
   a sampling phase and a regeneration phase borrow time from a preset phase to improve latch sensitivity associated with said circuit.

5. The circuit of claim 1 wherein said first regeneration stage comprises at least two input differential pairs with respect to a data input, a decision feedback equalization sum input, and/or an offset correction input.

6. The circuit of claim 1 wherein said second regeneration stage utilizes a single clock for sampling and a regeneration phase as an output of said first regeneration stage is valid for a unit interval time.

7. The circuit of claim 1 wherein said dock generation circuit employs a single phase of a clock to generate a clock for said first regeneration stage and said second regeneration stage to ensure a smoother transfer of partially regenerated data with respect to said first regeneration stage and said second regeneration stage.

8. A decision feedback equalization circuit, comprising:
   a first regeneration stage in association with a second regeneration stage to compensate for interference, wherein said first regeneration stage comprises at least two slicers corresponding to a set of speculative decisions;
   a multiplexer placed at an input port of said second regeneration stage to select a set of speculative decisions based on a previous decision; and
   a precise clock generation circuit connected to said first regeneration stage and said second regeneration stage to maximize re-generation time and improve sensitivity, wherein said first regeneration stage comprises at least two input differential pairs with respect to a data input, a decision feedback equalization sum input, and/or an offset correction input, and wherein said at least two input differential pairs are associated with a sampling clock in parallel with a regeneration inverter pair to permit additional voltage across a cross-coupled inverter regeneration pair of said circuit.

9. The circuit of claim 8 wherein said second regeneration stage utilizes a single clock for sampling and a regeneration phase as an output of said first regeneration stage is valid for a unit interval time.

10. The circuit of claim 8 wherein said dock generation circuit employs a single phase of a clock to generate a clock for said first regeneration stage and said second regeneration stage to ensure a smoother transfer of partially regenerated data with respect to said first regeneration stage and said second regeneration stage.

11. A decision feedback equalization circuit, comprising:
    a first regeneration stage in association with a second regeneration stage to compensate for interference wherein said first regeneration stage comprises at least two slicers corresponding to a set of speculative decisions;
    a multiplexer placed at an input port of said second regeneration stage to select a set of speculative decisions based on a previous decision;
    a precise clock generation circuit connected to said first regeneration stage and said second regeneration stage to maximize re-generation time and improve sensitivity; and
    a differential-pair that is re-usable for offset cancellation by merging an offset correction signal with a speculative h-tap correction signal to cancel a large offset without adding an additional load to said circuit and without adding limitations in latch sensitivity or speed to said circuit.

12. The circuit of claim 11 wherein said clock generation circuit comprises a sampling phase to sample an input signal.

13. The circuit of claim 11 wherein said clock generation circuit comprises a regeneration phase to regenerate said sampled data.

14. The circuit of claim 11 wherein said clock generation circuit comprises a preset phase to preset said regeneration node to a high or a low value in preparation for sampling next input data.

15. The circuit of claim 11 wherein:
said first regeneration stage comprises at least two input differential pairs with respect to a data input, a decision feedback equalization sum input, and/or an offset correction input; and
said at least two input differential pairs are associated with a sampling clock in parallel with a regeneration inverter pair to permit additional voltage across a cross-coupled inverter regeneration pair of said circuit.

16. The circuit of claim 11 wherein said second regeneration stage utilizes a single dock for sampling and a regeneration phase as an output of said first regeneration stage is valid for a unit interval time.

17. The circuit of claim 11 wherein said clock generation circuit employs a single phase of a clock to generate a clock for said first regeneration stage and said second regeneration stage to ensure a smoother transfer of partially regenerated data with respect to said first regeneration stage and said second regeneration stage.

18. A method of decision feedback equalization, said method comprising:
compensating for interference via a first regeneration stage in association with a second regeneration stage, wherein said first regeneration stage comprises at least two slicers corresponding to a set of speculative decisions;
selecting a set of speculative decisions based on a previous decision via a multiplexer placed at an input port of said second regeneration stage to select said set of speculative decisions based on said previous decision;
maximizing re-generation time and improving sensitivity via a precise clock generation circuit connected to said first regeneration stage and said second regeneration stage to maximize said re-generation time and improve said sensitivity; and
merging an offset correction signal with a speculative h-tap correction signal to cancel a large offset without adding an additional load and without adding limitations in latch sensitivity or speed to a circuit comprising the first regeneration stage, the second regeneration stage, the multiplexer, and the clock generation circuit.

19. The method of claim 18, wherein said clock generation circuit comprises a sampling phase to sample an input signal.

20. The method of claim 18, wherein said first regeneration stage comprises at least two input differential pairs with respect to a data input, a decision feedback equalization sum input, and/or an offset correction input.

* * * * *